Oct. 29, 1935.  J. L. KOPF ET AL  2,019,013
GRINDING MILL
Filed March 3, 1934  5 Sheets-Sheet 1

INVENTORS
JOSEPH L. KOPF
JOHN C. KOPF
BY
ATTORNEY

Oct. 29, 1935.　　　J. L. KOPF ET AL　　　2,019,013
GRINDING MILL
Filed March 3, 1934　　　5 Sheets-Sheet 2
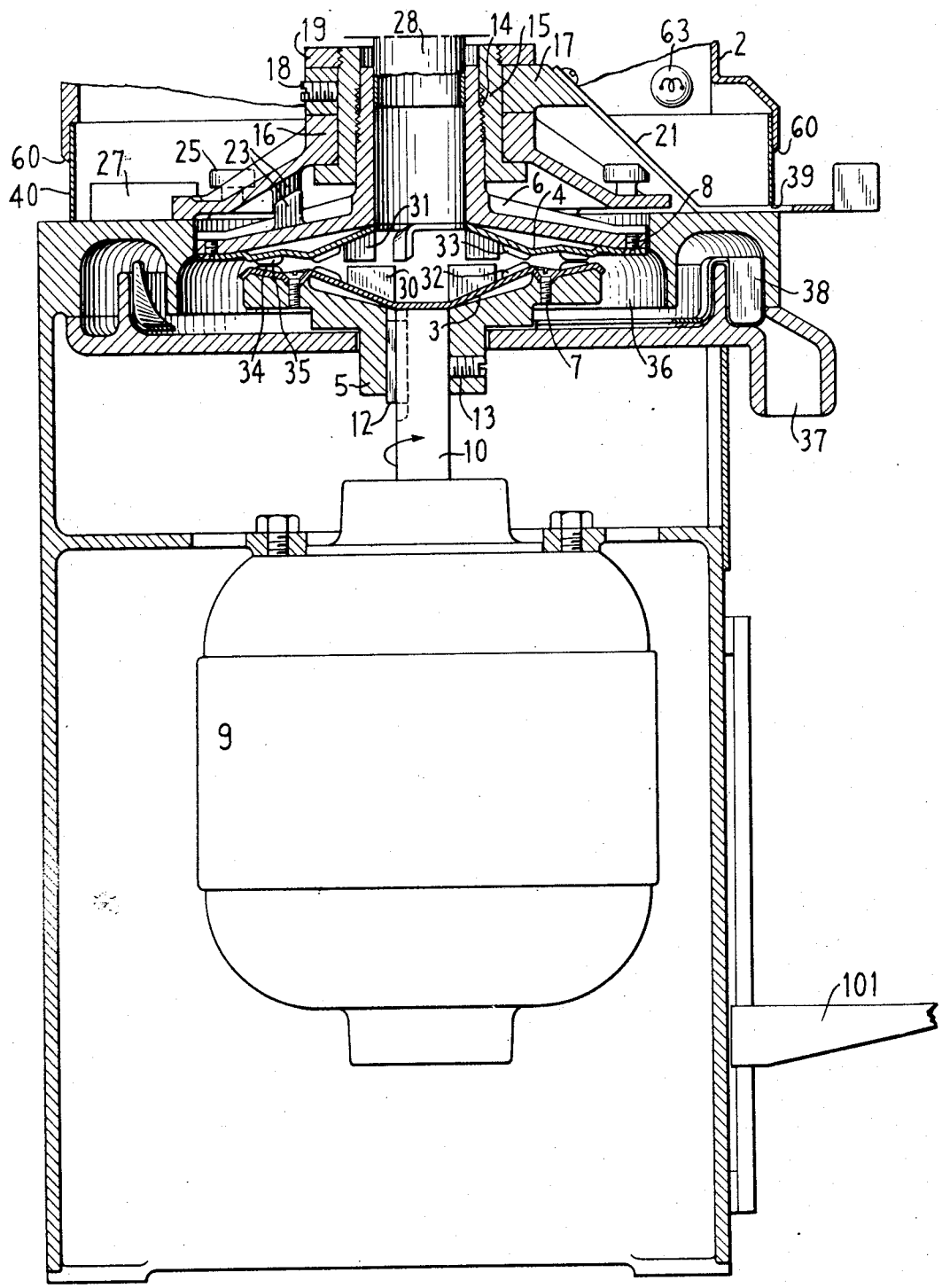
Fig-2.
INVENTORS
JOSEPH L. KOPF
JOHN C. KOPF
BY 
ATTORNEY

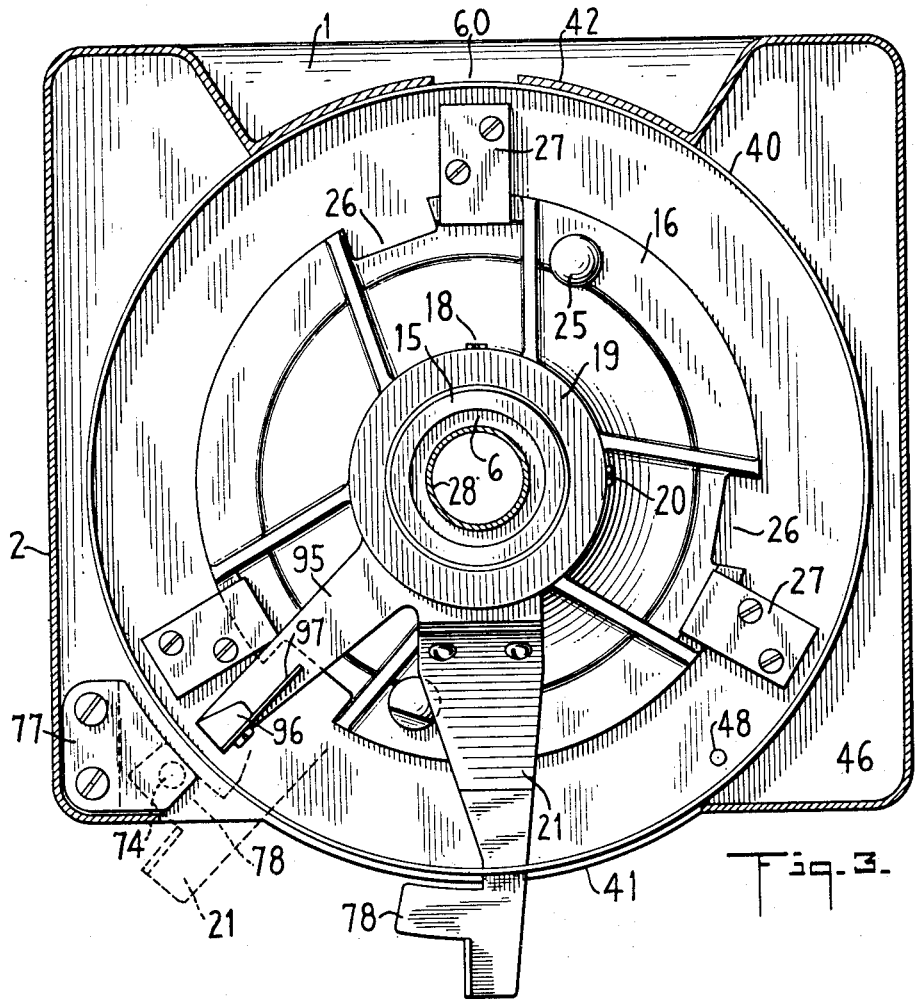
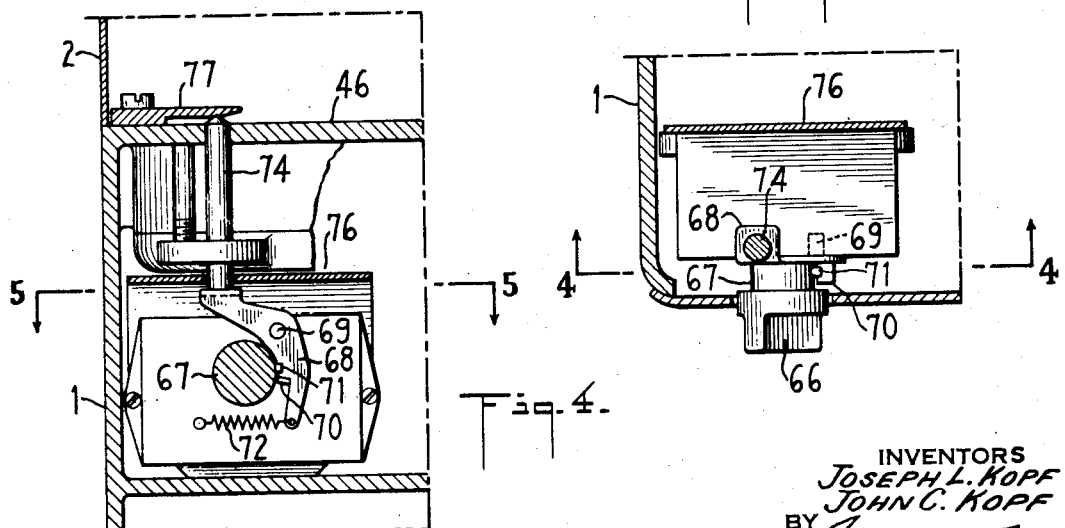

Oct. 29, 1935.  J. L. KOPF ET AL  2,019,013
GRINDING MILL
Filed March 3, 1934   5 Sheets-Sheet 4
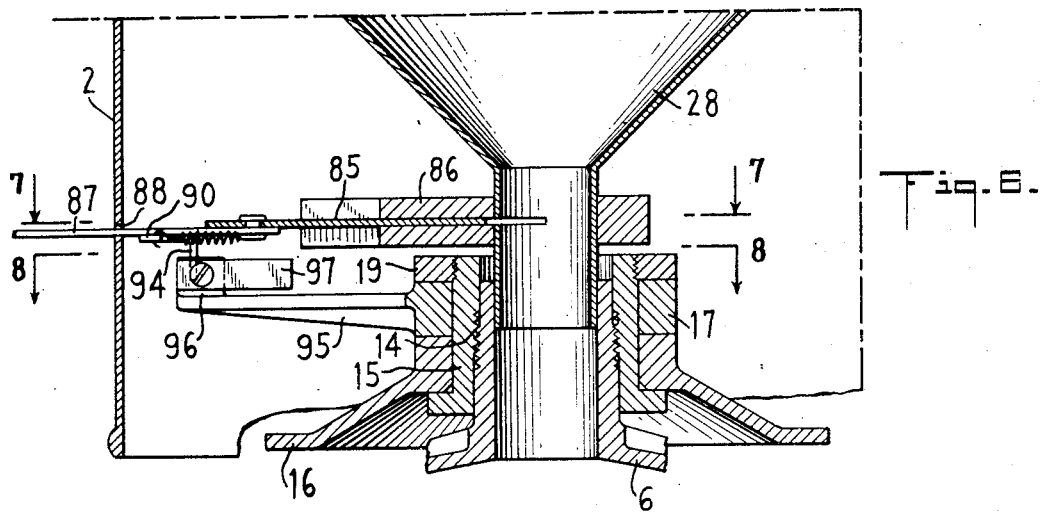
Fig. 6.
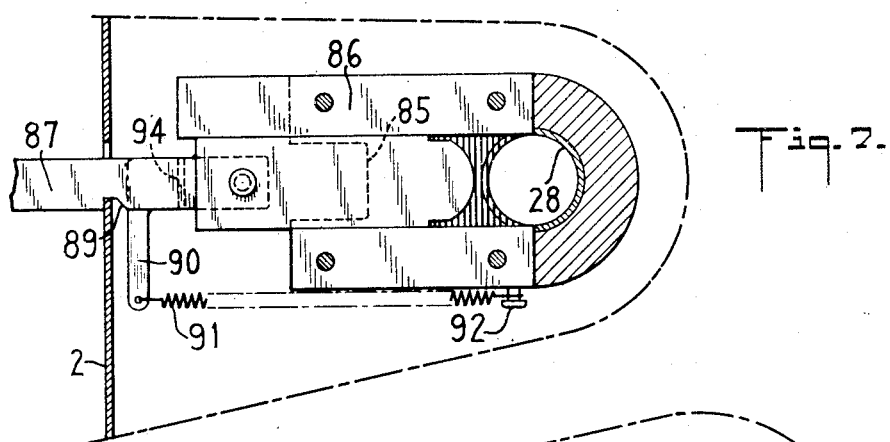
Fig. 7.
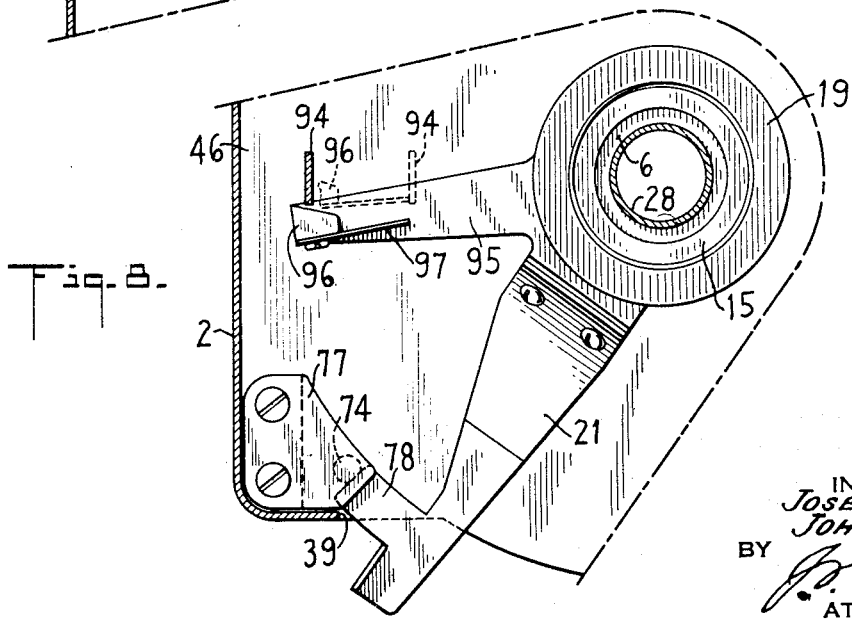
Fig. 8.
INVENTORS
JOSEPH L. KOPF
JOHN C. KOPF
BY
ATTORNEY Oct. 29, 1935.    J. L. KOPF ET AL    2,019,013
GRINDING MILL
Filed March 3, 1934    5 Sheets-Sheet 5
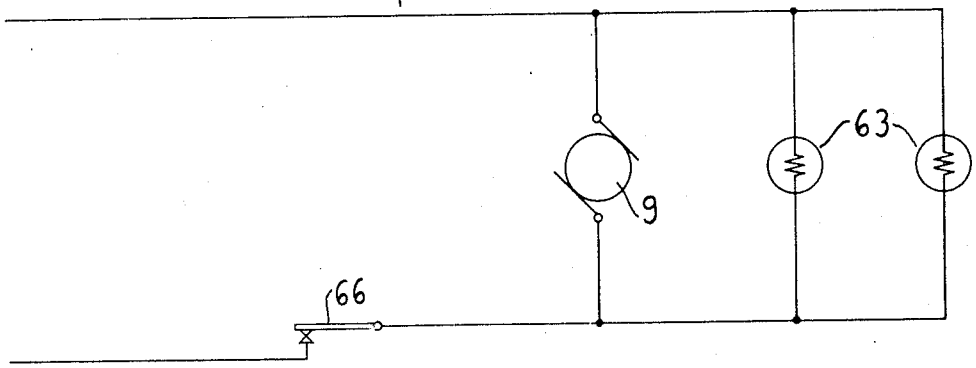
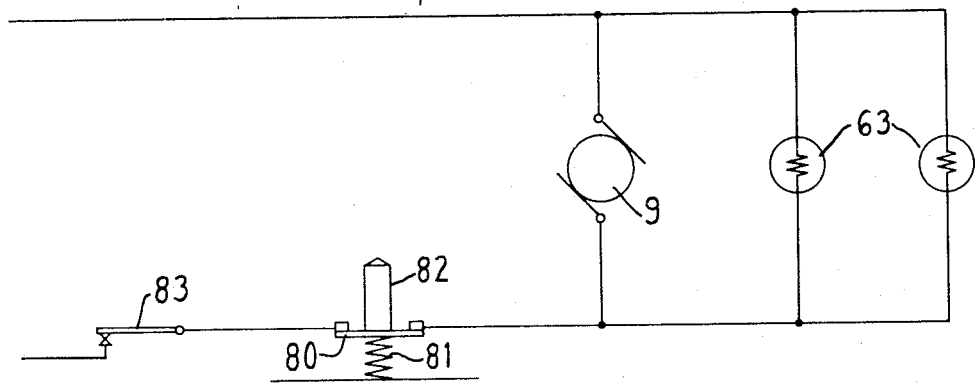
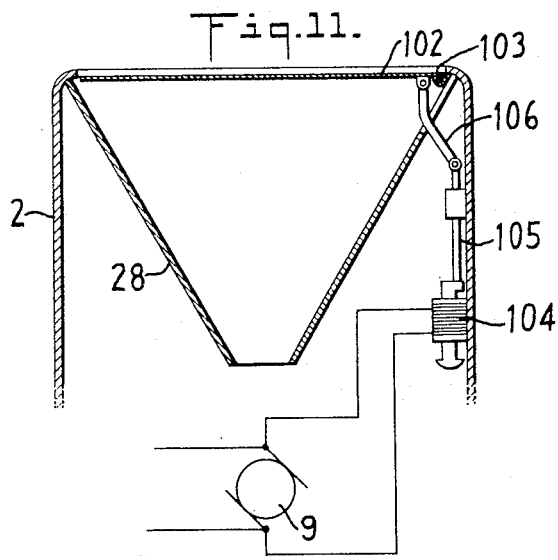
INVENTORS
JOSEPH L. KOPF
JOHN C. KOPF
BY
ATTORNEY Patented Oct. 29, 1935

2,019,013

UNITED STATES PATENT OFFICE 2,019,013

GRINDING MILL

Joseph L. Kopf, East Orange, N. J., and John C. Kopf, New York, N. Y., assignors to Jabez Burns & Sons, Inc., New York, N. Y., a corporation of New York Application March 3, 1934, Serial No. 713,794

7 Claims. (Cl. 83—18)

This invention relates to grinding mills for use in grocery stores, retail coffee shops, etc., and has for its object to provide an improved mill which may be set instantly and accurately to produce any desired grind of material and to insure the desired grind to each customer.

While some coffee manufacturers sell ground coffee packed in vacuum or other sealed tins, glass jars, etc., many retail merchants carry roasted bean coffee and grid it as sold. They feel that this practice keeps the coffee fresh until sold, saves the customer the expense of the vacuum tin or other air-tight container, and makes it possible to furnish any desired grind depending upon whether the customer intends to brew the coffee in the pot, in the percolator or by the drip method. If such retailers really grind their coffees to suit the requirements of individual customers they have a decided marketing advantage over sellers of factory-ground coffee who are compelled to carry several different grinds, instead of a single compromise grind, in order to best meet the requirements of customers.

Actually, retailers who carry whole bean coffee make little or no effort to ascertain or fulfill the requirements as to best type of grind, of individual buyers. Assuming that a store has a mill capable of producing various grinds, the clerk is instructed to ask the customer what grind is wanted, or what type of brewing device is used, and he is supposed to grind accordingly. In a recent survey covering a large number of retail stores, stocking coffee in the bean, we found that about two percent of the clerks asked what grind was wanted, and in about half these cases the wrong grind was furnished after the clerk has been asked for a certain grind. The usual practice is to give each customer the same grind as the preceding customer.

The factory-ground coffee merchant spends more money for packaging than his competitor who carries whole bean coffee and grinds it as sold, but the former unquestionably turns out a more uniform product, which is not only attractive to the purchaser but is furthermore calculated to give improved cup qualities when brewed. This is due to several causes. In the first place, the factories use large capacity grinding mills which can be regulated to a nicety and are capable of consistently producing standard grinds for any desired purpose, previous store mills being less efficient in this respect. In the second place, in factories turning out large quantities of ground coffee the grinding is under the direct supervision of an expert whose main interest is perfect grinding, whereas grinding in retail stores is done by clerks who have many duties to perform and have little time to devote to the art of grinding.

The present invention provides an improved grinding mill which is intended primarily for use in grocery stores, retail coffee shops, etc., is capable of performing on a small scale some or all of the functions of a modern coffee grinding and mixing plant, and is so constructed that it must be set before the mill is operated, thereby insuring individual attention and proper grinding for each customer. When we refer in our specification and claims to preventing "operation of the mill" we contemplate either preventing the admission of goods to the feed hopper, preventing feed of goods from the hopper to the grinding elements, preventing driving of the grinding elements by hand or power, or some other definite operation which must be performed before the mill can grind the goods. One mill, which we shall describe for purpose of illustration, embodies all of the following features:

1. Means for instantly and accurately setting the grinding elements to produce any desired grind—such as drip, percolator or pot—and for consistently reproducing such grinds.

2. A control mechanism which must be definitely set to produce some certain grind before each operation and must be returned to a neutral or non-grinding position in order to stop the mill.

3. Means for indicating the setting of the mill so that the customer will know exactly what grind is being made.

4. Means for limiting the size of the coarsest grind so as to prevent the production of non-usable coarse grinds.

Our intention is to protect all the novel features referred to above, and all others hereinafter described, whether used in our particular combinations or in conjunction with existing types of mills since many changes are permissible within the scope of our invention. With this in mind, the invention will be described in connection with the accompanying drawings, in which:

Fig. 2 is a vertical sectional view;

Fig. 3 is a plan view of the mechanism for adjusting the grinding element, locking the feed gate, and locking the electric control switch;

Fig. 4 is a vertical section on line 4—4 of Fig. 5, showing the locking mechanism of the electric control switch;

Fig. 5 is a horizontal section on line 5—5 of Fig. 4;

Fig. 6 is a vertical section through the feed hopper, gate and gate operating mechanism;

Fig. 7 is a horizontal section on line 7—7 of Fig. 6, showing the gate locking mechanism;

Fig. 8 is a horizontal section on line 8—8 of Fig. 6;

Fig. 9 is a diagram of the electric motor and lamp circuit;

Fig. 10 is a diagram showing a modification of this circuit and control means; and Fig. 11 is a diagrammatic view showing the hood of the machine with one method of locking and unlocking a cover or lid.

Figure 1:
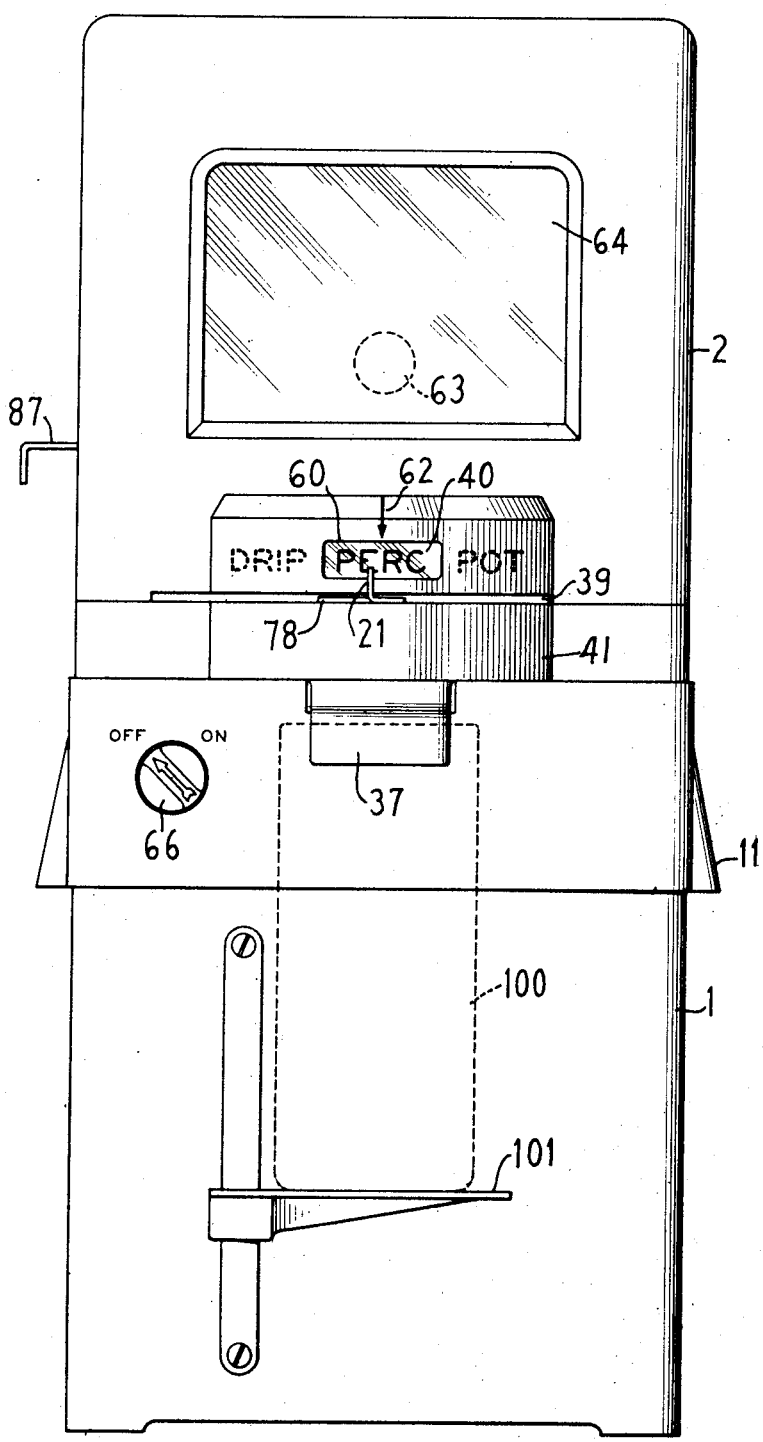
Fig. 1 is a front elevation of a grinding mill embodying the invention.

The mill illustrated has a casing 1 and hood 2 containing cooperating grinding elements 3 and 4 which in this instance are in the form of plates mounted horizontally within the casing. These plates are secured to carriers 5 and 6 respectively, by screws 7 and 8, as shown in Fig. 2.

Runner plate 3 is rotated by a motor 9 having its shaft 10 secured to plate carrier 5 by key 12 and set screw 13, rotation being in the direction of the arrow in Fig. 2. The motor may be ventilated by providing louvers 11 leading into the side of the casing as shown in Fig. 1. Grinding plate 4 is stationary but adjustable toward and away from plate 3 to vary the fineness of the grind and to compensate for plate wear.

To provide such adjustments, the hollow shank of plate carrier 6 is externally threaded at 14 to sleeve 15 which is rotatively mounted in support 16 on the top of the casing. Sleeve 15 carries an upper collar 17, which is secured thereto by set screw 18, and a nut 19 which is secured to the top of the sleeve by set screw 20. Collar 17 carries a control member such as lever 21 extending outside the casing. Movement of this lever to the right or left, as viewed in Fig. 3, rotates sleeve 15 and causes plate 4 to move toward or away from plate 3, cooperating lugs 23 on plate carrier 6 and support 16 preventing such plate carrier from rotating. The adjustment of this mechanism to provide a variety of different grinds, and to compensate for plate wear, will hereinafter be described.

The support 16 is provided with handles 25 for removing the plate adjusting mechanism from the mill; the support being rotated in a clockwise direction in Fig. 3 until its peripheral slots 26 register with retaining lugs 27 on the top of the casing, enabling the support and adjusting mechanism of plate 4 to be lifted as a unit from the casing. Hopper 28 forms part of the hood 2 and has its snout extending into the hollow shank of plate carrier 6 for feeding the coffee beans to the grinding plates.

Grinding plates 3 and 4 are provided with feeding or conveying flights 30 and 31, respectively, and with a plurality of cooperating circular sets of teeth 32, 33 and 34, 35 as shown in Fig. 2. The particular form of conformation of these grinding plates as well as the form or arrangement of the teeth thereon do not form a part of this invention.

These plates and cooperating mechanism for granulating and treating coffee are illustrated for convenience and are embodied in a copending application of John C. Kopf, Serial No. 714,929, filed March 10, 1934. The present invention is applicable to any form of granulating mechanism which may be a pair of plates, a rotating roll and bar, or a pair of rotating rolls.

In the form illustrated, the granulated coffee and partly reduced chaff are discharged into an annular chamber 36, having a discharge spout 37 and containing coffee treating and conveying elements 38.

The size of the granulated coffee produced by the mill depends, of course, upon the spacing of grinding plates 3 and 4. When adjusting the plates in the first instance, or at any time to compensate for wear, hood 2 is removed, set screw 18 is loosened and collar 17 is rotated by lever 21 until said lever 21 strikes a pin 48, shown in Fig. 3. Nut 19 is rotated until plates 3 and 4 just click, lever 21 still being held in contact with pin 48. With the parts in this position, set screw 18 is tightened to sleeve 15. Thereafter, movement of lever 21 to the left, as viewed in Fig. 3 causes separation of the grinding plates. Lever 21 moves in a slot 39 which is formed in the bottom of hood 2 as shown in Figs. 1 and 2. At its right-hand end, slot 39 terminates just short of pin 48, then when lever 21 strikes that end of the slot the plates 3 and 4 will be in the extreme closed position in which they will almost but not quite, touch each other. When lever 21 strikes the left-hand end of slot 39 the plates 3 and 4 will be in the extreme open position, and in this particular embodiment of the invention we shall refer to this position of lever 21 as the "neutral" or "non-grinding" position, because when the lever is in this position the mill is inoperative as hereinafter described. The neutral position, however, may be at the right-hand end of slot 39 or any other position of lever 21 except one of the predetermined grinding positions; in other words, the neutral position may be any position of lever 21 in which the mill will not grind, either because the grinding elements are together and incapable of passing the goods, or separated too far to grind, or because the feed mechanism is locked, or the power shut off, or because some other mechanism is operated manually or automatically to prevent the mill from functioning until lever 21 is moved away from the neutral position.

Between the extreme open and closed positions of lever 21 there are innumerable possible operative positions in which the grinding plates may be set to produce any desired grind. In the coffee trade the three common grinds, from largest to smallest, are the pot, percolator and drip grinds. Without restricting ourselves to any particular number or type of grind, we have, for purposes of illustration, represented the foregoing grinds by the words "Pot", "Perc" and "Drip" punched or otherwise formed in a band or dial 40, adapted to be rotated by lever 21 past windows 60 which are formed in arcuate extensions 41 and 42 in the front and back of hood 2. Therefore, both the customer and the clerk can see exactly what kind of a grind is being produced by the mill. Arrows 62 mark the centers of windows 60 and dial 40 is so lettered and mounted on lever 21 that the respective word, when properly centered in windows 60, will correspond to the desired standard pot, percolator and drip grinds. Thus to obtain a drip grind, lever 21 is moved to the right in Figs. 1 and 3 until the word "Drip" appears at windows 60, this movement of lever 21 bringing the plates close together since the "Drip" is the finest of the three predetermined grinds. In Fig. 1, the word "Perc" appears in one of the windows, and in this position of lever 21 the plates are spaced to produce an intermediate grind suitable for brewing in a percolator. To obtain a pot grind the lever is moved toward the left in Figs. 1 and 3 until the word "Pot" appears in the windows, this being the coarsest of the three grinds. The portion of dial 40 behind the window is illuminated by lamps 63 which are energized only when the mill is in operation, the same illuminating means being used to light up display signs 64 in the front and back of the hood 2.

The operating member or lever 21 controls a switch operating motor 9 and lamps 63, making it necessary to return lever 21 to the aforesaid neutral position in order to stop the motor and extinguish the lamps after each grinding operation, and to reset the lever before each succeeding batch is ground. This may be accomplished in various ways. For example, motor 9 and lamps 63 may be controlled by switch 66 located on the front of the mill and connected in circuit with the motor and lamps as shown in Fig. 9. Switch 66 is a snap switch having a rotatable arbor 67 which is normally locked against rotation by lever 68, said lever being pivoted at 69 and having a detent 70 which is held in engagement with pin 71 of arbor 67 by the action of spring 72 as shown in Figs. 4 and 5. In the position shown in Figs. 1, 4 and 5, switch 66 is turned off and can only be turned on when lever 68 is pivoted against the action of spring 72 to force detent 70 out of the path of pin 71. Lever 68 is actuated by plunger 74 which is supported by bracket 75 and has its lower end extending through switch housing 76 in contact with lever 68 and its upper end contacting with a ledge 77 which is secured to the top plate 46 of the casing. Lever 21 has a flat extension 78 which fits beneath ledge 77 and depresses plunger 74 when lever 21 is in the neutral position at the extreme left end of cover slot 39 as shown in dotted lines in Fig. 3, the upper end of plunger 74 being beveled for cooperative engagement with extension 78 as shown in Fig. 4. When plunger 74 is depressed in this manner lever 68 is tipped on its pivot, moving detent 70 out of the path of pin 71 and permitting switch 66 to be turned on. If switch 66 is turned on, starting motor 9 and lighting lamps 63, and lever 21 is then moved to an operative position corresponding to a pot, percolator or drip grind as the case may be, spring 72 will return lever 68 and associated parts to the position shown in Fig. 4 except that detent 70 will be above pin 71. Now, in order to stop motor 9 and extinguish lamps 63, it is necessary to rotate switch arbor 67 in a counter-clockwise direction as viewed in Fig. 4, which is impossible unless lever 21 is first returned to neutral position depressing plunger 74 and unlocking the switch as previously described. Hence lever 21 must be moved to neutral position in order to stop the mill, and must be definitely reset by the operator before each succeeding grind.

The alternative circuit of Fig. 10 eliminates switch 66 and operates motor 9 and lamps 63 automatically under control of lever 21. This circuit is operated by switch 80 which is normally closed by spring 81 and is opened by a plunger 82 which replaces plunger 74 of Figs. 3, 4 and 5 and is operated by extension 78 of lever 21 in the same manner as plunger 74. When lever 21 is in the neutral position at the extreme left end of cover slot 39, extension 78 depresses plunger 82 and opens switch 80, stopping motor 9 and extinguishing lamps 63. When lever 21 is moved to one of the grinding positions it releases plunger 82 and switch 80 is closed by spring 81. It is therefore necessary to return lever 21 to neutral position in order to stop the motor and extinguish the lamps at the conclusion of a grinding operation, and to reset the lever in order to operate the mill for the next grinding operation. The circuit of Fig. 10 may be provided with a manually operable safety switch 83 suitably mounted on the mill.

The flow of goods from hopper 28 is controlled by feed gate 85 slidable in track 86 which is secured to the hopper as shown in Figs. 6 and 7. Gate 85 is operated by handle 87 which extends through slot 88 in hood 2 and has a notch 89 adapted to engage the edge of slot 88 to hold the gate open. Handle 87 has an offset projection 90 on the edge containing notch 89, this projection being connected by spring 91 to a pin 92 on track 86 so that the spring causes handle 87 to bear against the edge of slot 88 and engage notch 89 with said edge when the gate is opened as shown in Fig. 7. An abutment 94 is carried by the underside of handle 87 and forms part of the mechanism for automatically closing and locking gate 85 when the control member or lever 21 of the mill is in the neutral position referred to above. To accomplish such automatic closing and locking of the gate, collar 17, which is rotated by lever 21 to vary the spacing of grinding plates 3 and 4, has an arm 95 carrying an upstanding cam 96 and flexible finger 97. Arm 95 is so disposed with respect to lever 21 that, as lever 21 approaches its neutral position at the left end of cover slot 39, cam 96 strikes abutment 94 on the underside of gate handle 87, forcing notch 89 out of engagement with the edge of slot 88 and causing gate 85 to close under the action of spring 91 as shown in Fig. 8 where the gate is starting to close. Then, when lever 21 reaches the aforesaid neutral position at the extreme left end of slot 39, cam 96 reaches the position formerly occupied by abutment 94, and flexible finger 97 springs in front of abutment 94 and locks the gate closed as shown in dotted lines in Fig. 8. Thereafter it is impossible to open the gate until lever 21 is moved from its neutral position to one or another of the operative positions referred to above. Hence it is impossible to pass goods from hopper 28 to the grinding plates until the operator has set the mill to produce some usable grind.

The operation of the mill shown is as follows: Coffee is dumped into hopper 28 and a paper bag or other container 100 is placed on adjustable stand 101 beneath discharge spout 37 as shown in Fig. 1. Container 100 may be the one in which the weighed roasted bean coffee is received by the retailer, usually containing one, two or three pounds of coffee, so that the customer can see at a glance that he or she is receiving the desired brand of coffee in its original container. Switch 66 is then turned on, it being understood that the switch is unlocked by extension 78 of lever 21 which is in neutral position at the extreme left end of slot 58. The turning on of switch 66 starts motor 9 and energizes lamps 63 which illuminate dial 40 and display sign 64 in the front of the mill. Lever 21 is then pushed to the right until the proper insignia, "Pot", "Perc" or "Drip" appears at windows 60. Lever 21 must be moved from "neutral" in order to unlock hopper feed gate 85, and, since the setting is done in full view of the customer and requires no extra attention on the part of the clerk, the natural tendency, amounting almost to compulsion, will be to ascertain and fulfill the precise requirements of individual customers. With lever 21 in the proper operative position, feed gate 85 is opened by pulling handle 87 out until automatically locked by notch 89 as shown in Fig. 7. This allows coffee to run through the hollow shank of plate carrier 6 to the grinding plates. At the conclusion of the grind lever 21 must be returned to neutral position at the extreme left end of slot 39 in order to unlock switch 66 which may then be turned off to stop motor 9 and extinguish lamps 63, lever 21 also closing and locking feed gate 85 as previously described.

When using the control system of Fig. 10, the operator dumps coffee into hopper 28, moves lever 21 to the right until the proper insignia, "Pot", "Perc" or "Drip" appears at window 60, and then opens feed gate 85 by pulling out handle 87. In this case setting of lever 21 not only unlocks the feed gate as before but also releases plunger 82 thereby permitting switch 80 to close which starts motor 9 and lights lamps 63, it being understood that safety switch 83 is normally closed. At the conclusion of the grind, lever 21 is returned to neutral position at the extreme left end of slot 39, thereby depressing plunger 82 which opens switch 80 stopping motor 9 and extinguishing lamps 63, and also closing and locking feed gate 85 as previously described.

Fig. 11 illustrates a method of preventing the mill from operating except under predetermined conditions. In this form, the hood 2 is provided with a tight-fitting lid 102 hinged at 103 to the hood 2. A solenoid 104, connected in parallel with the motor 9 is energized when the motor is running. A rod 105 and connecting link 106 transmits the motion of the core of the solenoid to the lid which raises the same. After the power is shut off the lid again closes by gravity and in this condition cannot be manually opened.

Having thus described our invention, what we claim as new, novel and useful is:

1. The combination with a grinding mill, of means for setting the mill to produce different grinds, an indicator actuated by said setting means, and means controlled by the position of said setting means for operating said mill and illuminating said indicator.

2. The combination with a grinding mill, of a motor for driving said mill, a gate for admitting material to said mill, means for setting said mill to produce different grinds, a control member for said setting means movable into a neutral non-grinding position and into a plurality of operative positions corresponding to different grinds, an indicator actuated by said control member, means for illuminating said indicator when said control member is in said operative positions, means for stopping said motor when said control member is in said neutral position and for operating said motor when said control member is in said operative positions, and means for closing and locking said gate when said control member is in said neutral position and for unlocking said gate when said control member is in said operative positions.

3. A mill comprising cooperating grinding elements, a gate controlling the flow of material to said elements, mechanism for adjusting the separation of said elements to provide a plurality of different grinds, a control member for said adjusting mechanism movable into a neutral non-grinding position and into a plurality of operative positions corresponding to different grinds, and means actuated by said control member when in said neutral position to close and lock said gate.

4. A mill comprising cooperating grinding elements, a gate controlling the flow of material to said elements, a motor for rotating at least one of said elements, mechanism for adjusting the separation of said elements to provide a plurality of different grinds, a control member for said adjusting mechanism movable into a neutral non-grinding position and into a plurality of operative positions corresponding to different grinds, means actuated by said control member when in said neutral position to close and lock said gate, means for operating said motor, and means operative to stop said motor only when said control member is in said neutral position.

5. A mill comprising cooperating grinding elements, a gate controlling the flow of material to said elements, a motor for rotating at least one of said elements, a switch for operating said motor, means for locking said switch, mechanism for adjusting the separation of said elements to provide a plurality of different grinds, a control member for said adjusting mechanism movable into a neutral non-grinding position and into a plurality of operative positions corresponding to different grinds, means actuated by said control member when in said neutral position to close and lock said gate, and means actuated by said control member when in said neutral position to unlock said switch.

6. A mill comprising cooperating grinding elements, a gate controlling the flow of material to said elements, a motor for rotating at least one of said elements, mechanism for adjusting the separation of said elements to provide a plurality of different grinds, a control member for said adjusting mechanism movable into a neutral non-grinding position and into a plurality of operative positions corresponding to different grinds, means actuated by said control member when in said neutral position to close and lock said gate, and means actuated in the neutral position of said control member to stop said motor and in the operative positions of said control member to operate said motor.

7. A mill comprising cooperating grinding elements, a sliding gate controlling the flow of material to said elements, a catch for holding said gate open, mechanism for adjusting the separation of said elements to provide a plurality of different grinds, a control member for said adjusting mechanism movable into a neutral non-grinding position and into a plurality of operative positions corresponding to different grinds, means actuated by said control member when in said neutral position to release said catch and close said gate, and means actuated by said control member when in said neutral position to lock said gate.

JOSEPH L. KOPF.
JOHN C. KOPF.